US012591960B2

(12) United States Patent
Wang et al.

(10) Patent No.: US 12,591,960 B2
(45) Date of Patent: Mar. 31, 2026

(54) OPTICAL DEVICE AND DIRT LEVEL DETERMINING METHOD

(71) Applicant: PixArt Imaging Inc., Hsin-Chu City (TW)

(72) Inventors: Guo-Zhen Wang, Hsin-Chu City (TW); Hung-Ching Lai, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 953 days.

(21) Appl. No.: 17/742,413

(22) Filed: May 12, 2022

(65) Prior Publication Data

US 2022/0270233 A1      Aug. 25, 2022

Related U.S. Application Data

(63) Continuation-in-part of application No. 17/393,424, filed on Aug. 4, 2021, now Pat. No. 11,703,458.

(60) Provisional application No. 63/121,969, filed on Dec. 6, 2020.

(51) Int. Cl.
| | |
|---|---|
| *G06K 9/00* | (2022.01) |
| *G06T 7/00* | (2017.01) |
| *H04N 23/56* | (2023.01) |

(52) U.S. Cl.
CPC .............. *G06T 7/0002* (2013.01); *G06T 7/97* (2017.01); *H04N 23/56* (2023.01)

(58) Field of Classification Search
CPC ........ A47L 11/24; A47L 9/2815; A47L 11/28; A47L 11/00; A47L 9/2826; G01N 21/94; G01N 21/9018; G01N 21/4738; G01N 21/8806; G06T 7/0002; G06T 7/97; H04N 23/56

See application file for complete search history.

(56) References Cited

U.S. PATENT DOCUMENTS

| | | | |
|---|---|---|---|
| 6,680,479 | B1 | 1/2004 | Murray |
| 8,719,998 | B1 | 5/2014 | Huffman |
| 9,074,355 | B2 | 7/2015 | Jallon |
| 2009/0218478 | A1 | 9/2009 | Kim |
| 2009/0223635 | A1 | 9/2009 | Lawless |
| 2015/0362921 | A1 | 12/2015 | Hanaoka |
| 2017/0071436 | A1 | 3/2017 | Hofner |
| 2017/0332872 | A1* | 11/2017 | Jun ..................... A47L 11/4066 |
| 2019/0029486 | A1* | 1/2019 | Suvarna ................ A47L 9/2857 |
| 2020/0114517 | A1 | 4/2020 | Wang |
| 2020/0315421 | A1* | 10/2020 | Kung .................... G08B 21/02 |
| 2021/0157237 | A1 | 5/2021 | Hayashi |
| 2022/0128352 | A1 | 4/2022 | Binder |

FOREIGN PATENT DOCUMENTS

| | | |
|---|---|---|
| CN | 108742333 A | 11/2018 |
| CN | 108968805 A | 12/2018 |
| CN | 110558902 A | 12/2019 |

(Continued)

*Primary Examiner* — Gregory A Morse
*Assistant Examiner* — Kevin M Coomber
(74) *Attorney, Agent, or Firm* — Winston Hsu

(57) ABSTRACT

An optical device, comprising: a processing circuit; a light source, configured to emit light to a surface; and an optical sensor, configured to sense optical data generated based on reflected light or scattering light of the light. The processing circuit computes a dirt level of the surface according to the optical data.

12 Claims, 4 Drawing Sheets

(56)          References Cited

FOREIGN PATENT DOCUMENTS

| CN | 110658131 | A |   | 1/2020 |   |   |
|----|-----------|---|---|--------|---|---|
| CN | 111000491 | A |   | 4/2020 |   |   |
| CN | 111000498 | A |   | 4/2020 |   |   |
| CN | 111246204 | A | * | 6/2020 | ........... | H04N 17/002 |
| JP | 02147846  | A | * | 6/1990 |   |   |
| TW | 201808197 | A |   | 3/2018 |   |   |

* cited by examiner

OPTICAL DEVICE AND DIRT LEVEL DETERMINING METHOD

CROSS REFERENCE TO RELATED APPLICATIONS

This application is a continuation-in-part of U.S. application Ser. No. 17/393,424, filed on Aug. 4, 2021, which claims the benefit of U.S. Provisional Application No. 63/121,969, filed on Dec. 6, 2020. The contents of these applications are incorporated herein by reference.

BACKGROUND OF THE INVENTION

1. Field of the Invention

The present invention relates to an optical device and a dirt level determining method, and particularly relates to an optical device and a dirt level determining method which can determine a dirt level according to optical data.

2. Description of the Prior Art

In recent years, an auto cleaner (or named as a sweeping robot, a robot cleaner) becomes more and more popular. However, the suction power of the auto cleaner needs to be manually adjusted, thus it is hard to select a suitable suction power. For example, if the suction power remains weak, the ground may not be clearly cleaned. On the opposite, if the suction power remains strong, the power consumption is high and the duration of service of the auto cleaner may decrease.

SUMMARY OF THE INVENTION

One objective of the present invention is to provide an optical device which can determine a dirt level according to optical data.

Another objective of the present invention is to provide a dirt level determining method which can determine a dirt level according to optical data.

One embodiment of the present invention provides an optical device, comprising: a processing circuit; a light source, configured to emit light to a surface; and an optical sensor, configured to sense optical data generated based on reflected light or scattering light of the light. The processing circuit computes a dirt level of the surface according to the optical data.

Another embodiment of the present invention provides a dirt level determining method, applied to an optical device comprising a light source and an optical sensor, comprising: (a) emitting light to a surface by the light source; and (b) sensing optical data generated based on reflected light or scattering light of the light by the optical sensor; and (c) computing a dirt level of the surface according to the optical data.

In view of above-mentioned embodiments, the dirt level can be determined according to optical data, thus the operation of the auto cleaner or any other optical device can be properly controlled corresponding to the dirt level.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figures 1, 2:
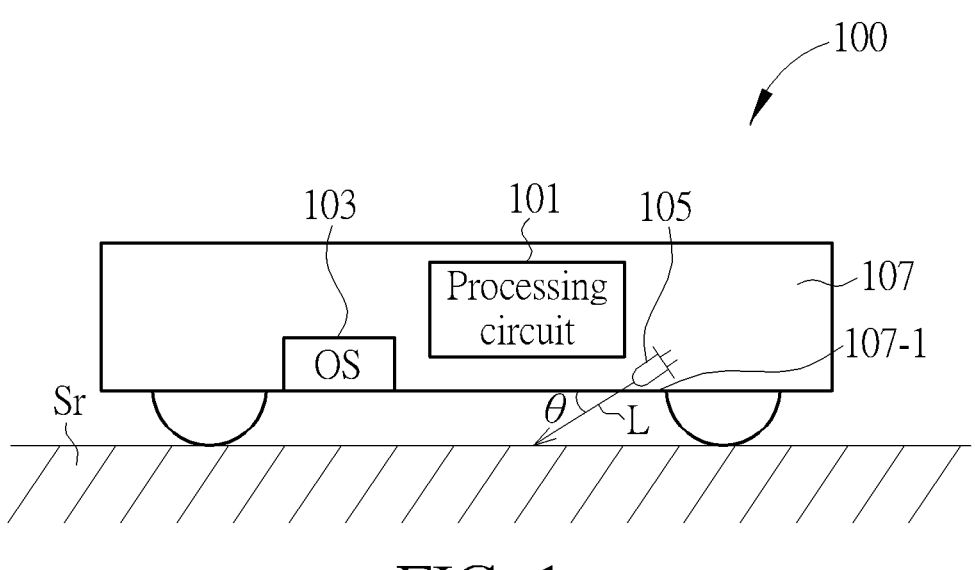
FIG. 1 is a block diagram illustrating an auto cleaner according to one embodiment of the present invention.
FIG. 2 is a schematic diagram illustrating that scattering light is generated when the light is emitted to dirt on the surface, according to one embodiment of the present invention.

FIG. 1 is a block diagram illustrating an auto cleaner 100 according to one embodiment of the present invention. As illustrated in FIG. 1, the auto cleaner 100 comprises a processing circuit 101, an optical sensor 103 and a light source 105. The light source 105 is configured to emit light L, which can be region light or line light, to a surface Sr. In one embodiment, the surface Sr is a ground on which the auto cleaner 100 is located, but not limited. The optical sensor 103 is configured to sense optical data generated based on reflected light or scattering light of the light L. Also, the processing circuit 101 computes a dirt level of the surface Sr according to the optical data. In following embodiments, the optical sensor 103 is an image sensor, thus optical data is image(s). However, please note the optical data can be any other data which can represent optical feature such as brightness.

FIG. 2 is a schematic diagram illustrating that scattering light is generated when the light is emitted to dirt on the surface, according to one embodiment of the present invention. As illustrated in FIG. 2, when the light L is emitted to dirt 201, the light L is scattered thus scattering light SL is generated and the scattering light SL can be sensed by the optical sensor 103. Therefore, dirt on the surface Sr generates a bright region in an image of the surface Sr since the optical sensor 103 senses scattering light. It will be appreciated that the dirt can mean any unwanted things on the surface Sr, such as dusts, hairs, paper scraps, small stones, or plastic fragments. Also, the light L is reflected if the surface Sr has no dirt.

Figure 3:
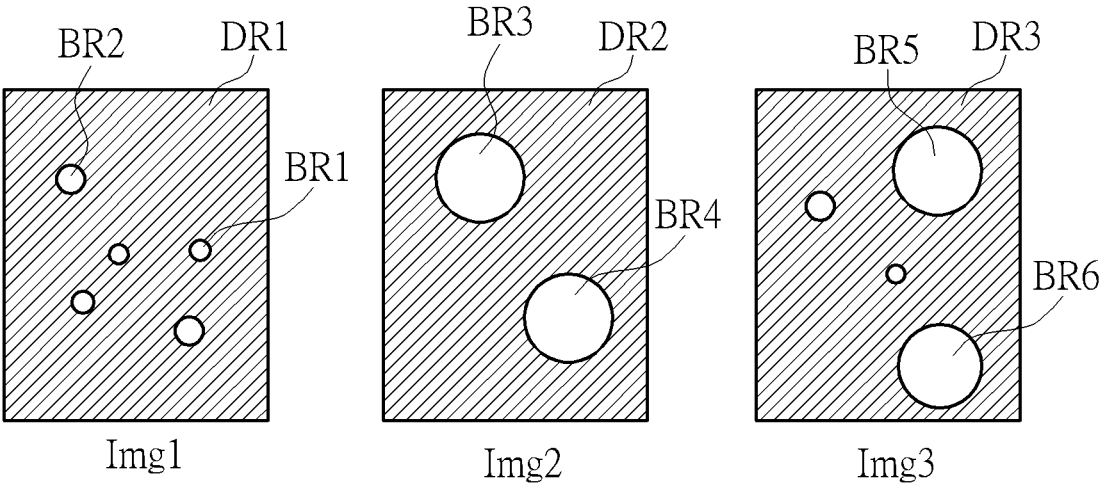
FIG. 3 and FIG. 4 are schematic diagrams illustrating how the dirt level is determined according to optical data, according to different embodiments of the present invention.

FIG. 3 is a schematic diagram illustrating how the dirt level is determined according to images, according to one embodiment of the present invention. In the embodiment of FIG. 3, the images Img1, Img2 and Img3 are images sensed by the optical sensor 103 in FIG. 1 at different time, when the auto cleaner 100 is provided on the surface Sr. As above-mentioned, dirt on the surface Sr generates a bright region in an image of the surface Sr. Therefore, the bright regions BR1, BR2 in the image Img1, the bright regions BR3, BR4 in the image Img2, and the bright regions BR5, BR6 in the image Img3 correspond to dirt on different locations of the surface Sr. Please note, only partial of the bright regions in the images Img1, Img2, Img3 are symbolized. Also, the images Img1, Img2 and Img3 respectively comprises dark regions DR1, DR2 and DR3, which correspond to a region of the surface Sr which has no dirt or the dirt is too few thus non or only new reflecting light is sensed.

In one embodiment, the processing circuit 101 computes the dirt level according to a proportion between an area of the bright region(s) in a single image and an area of all regions of the image (i.e., an area of the whole image) or according to a number of the bright region(s) in a single image. In such embodiment, the processing circuit 101 computes the dirt level according to bright regions in only one image but not according to bright regions in any other image. For example, the processing circuit 101 computes the dirt level according a proportion between a total area of the bright regions in the image Img1 without considering the bright regions in images Img2, Img3.

In another embodiment, the processing circuit 101 computes the dirt level according to a proportion between an area of all of the bright regions in more than one images and an area of all regions of the images, or according to a number of all of the bright regions in the images. For example, the processing circuit 101 computes the dirt level according a proportion between a total area of the bright regions in the images Img1, Img2, Img3 and a total area of the images Img1, Img2, Img3, or according to the number of the bright regions in the images Img1, Img2, Img3. Please note, the area mentioned in the embodiment of FIG. 3 can correspond to pixel numbers of the image.

In the above-mentioned embodiments, the larger the proportion of the bright regions, the higher the dirt level is. Alternatively, the more the number of the bright regions, the higher the dirt level is. In one embodiment, the dirt level can be determined according to both of the proportion and the number. Also, in another embodiment, different weightings can be given to the proportion and the number, to determine the dirt level, depending on the setting provided by the user. For example, if the user cares about the area of the dirt more than the number of the bright regions, the user can give a larger weighting to the area. On the opposite, if the user cares about the number of the bright regions more than the area of the dirt, the user can give a larger weighting to the number.

In one embodiment, after the dirt level is determined, the suction power can be automatically adjusted by the processing circuit 101. For example, the higher the dirt level, the larger the suction power is. On the opposite, the lower the dirt level, the smaller the suction power is. By this way, the suction power can be properly adjusted. The auto cleaner 100 can be controlled to perform other operations corresponding to the dirt level rather than limited to adjust the suction power. For example, the auto cleaner 100 can generate a reminding message to remind the user that the dirt level is still high even if the surface Sr has been cleaned one time or several times.

Please refer to FIG. 1 again, in one embodiment, the auto cleaner further comprises a case 107, which comprises a case surface 107_1. In one embodiment, the case surface 107_1 is a bottom surface of the case 107 when the auto cleaner 100 is located on the surface Sr. The optical sensor 103 and the light source 105 can be provided inside or on the case 107. In one embodiment, optical sensor 103 and the light source 105 are provided on the case surface 107_1. An angle θ between an emitting direction of the light L and the case surface 107_1 is smaller than a predetermine angle, such that a brightness of the dark region illustrated in FIG. 3 is lower than a first predetermined brightness. By this way, the difference between the dark region and the bright region can be large enough for determining the dirt level. The angle θ can also mean the angle between the surface Sr and the emitting direction. Please note, the emitting direction of the light L and the case surface 107_1 may form two angles, and the angle θ is the smaller angle of the two angles.

It will be appreciated that the emitting angle or the location of the light source 105 can be set corresponding to different requirements. For example, the emitting angle of the light source 105 can be set corresponding to the type of the light source of the light wavelength. Also, the location of the light source 105 can be set corresponding the structure or the size of the auto cleaner 100.

In the above-mentioned embodiments, the dirt level is determined according to the proportion and the number of the bright regions. However, in some cases, the regions having dirt may have brightness lower than the regions having no dirt, due to various reasons. For example, the material or the composition of the surface, the material of dirt or the wavelengths of the light generated by the light source may cause that the regions having dirt have brightness lower than the regions having no dirt.

Figure 4:
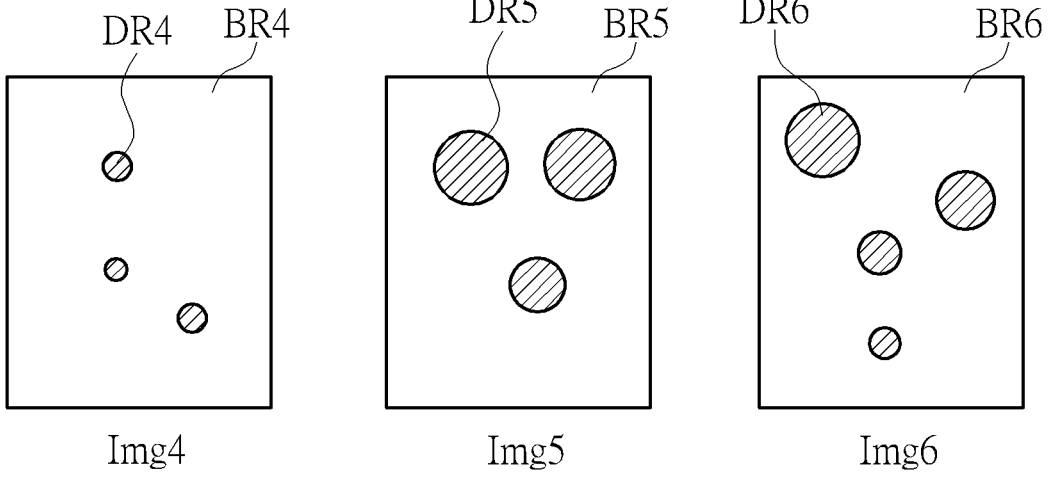

Therefore, in the embodiment of FIG. 4, the images Img4, Img5 and Img6 are images sensed by the optical sensor 103 in FIG. 1 at different time, when the auto cleaner 100 is provided on the surface Sr. However, dirt on the surface Sr generates a dark region in an image of the surface Sr rather than a bright region. Therefore, the dark regions DR4 in the image Img4, the dark region DR5 in the image Img5, and the dark regions DR6 in the image Img6 correspond to dirt on different locations of the surface Sr. Please note, only part of the dark regions in the images Img4, Img5, Img6 are symbolized. Also, the images Img4, Img5 and Img6 respectively comprises bright regions BR4, BR5 and BR6, which correspond to a region of the surface Sr which has no dirt or the dirt is too few thus non or only new reflecting light is sensed.

In one embodiment, the processing circuit 101 computes the dirt level according to a proportion between an area of the dark region(s) in a single image and an area of all regions of the image or according to a number of the dark region(s) in a single image. In such embodiment, the processing circuit 101 computes the dirt level according to the dark region in only one image but not according to the dark region any other image. For example, the processing circuit 101 computes the dirt level according a proportion between a total area of the dark regions in the image Img4 without considering the dark regions in images Img5, Img6.

In another embodiment, the processing circuit 101 computes the dirt level according to a proportion between an area of all of the dark regions in more than one images and an area of all regions of the images, or according to a number of all of the dark regions in the images. For example, the processing circuit 101 computes the dirt level according a proportion between a total area of the dark regions in the images Img4, Img5, Img6 and a total area of the images Img4, Img5, Img6. Please note, the area mentioned in the embodiment of FIG. 4 can be pixel numbers of the image.

Therefore, in one embodiment, the angle θ between an emitting direction of the light and the case surface 107_1 is smaller than a predetermine angle, such that a brightness of the bright region illustrated in FIG. 4 is higher than a second predetermined brightness. By this way, the difference between the dark region and the bright region can be large enough for determining the dirt level.

Please note, although auto cleaner is taken as an example for explaining, the above-mentioned embodiments can be provided to any other optical device, such as an optical mouse or any kind of moving robot.

In view of above-mentioned embodiments, a dirt level determining method which is applied to an optical device comprising a light source and an optical sensor is acquired. The dirt level determining method comprises the steps illustrated in FIG. 5, which are shown as follows:

Step 501

Emit light to a surface (e.g., the surface Sr in FIG. 1) by the light source.

Step 503

Sense optical data generated based on reflected light or scattering light of the light by the optical sensor.

Step 505

Compute a dirt level of the surface according to the optical data.

Figure 5:
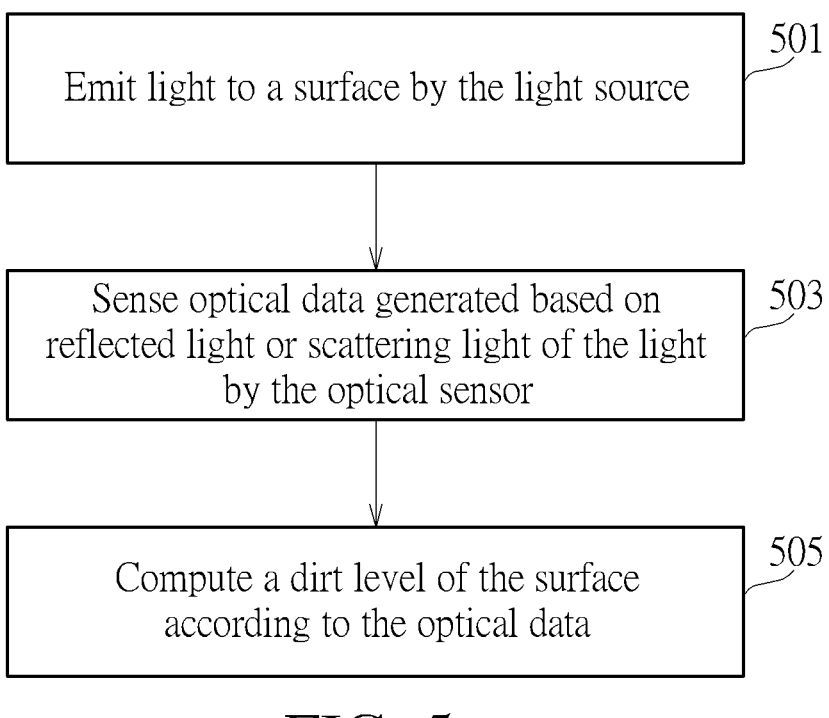
FIG. 5 is a flow chart illustrating a dirt level determining method according to one embodiment of the present invention.

In one embodiment, the dirt level determining method in FIG. 5 can further comprise: controlling the optical device to operate corresponding to the dirt level. In such case, the dirt level determining method can be considered as an optical device control method.

Figure 6:
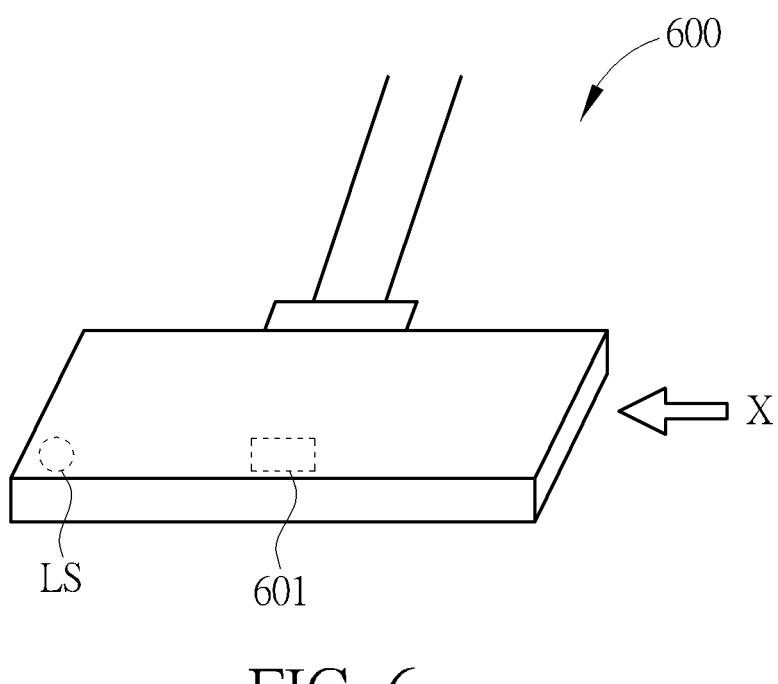
FIG. 6 and FIG. 7 are schematic diagrams illustrating other embodiments provided by the present application.
Figure 7:
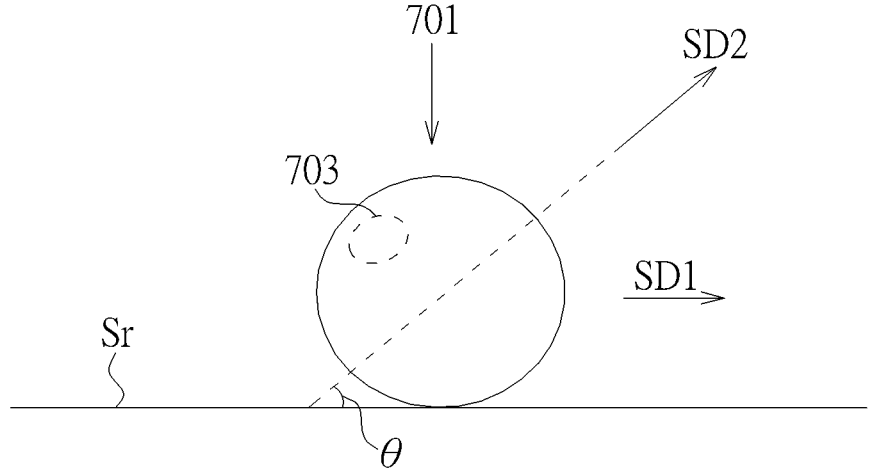

FIG. 6 and FIG. 7 are schematic diagrams illustrating other embodiments provided by the present application. In the embodiments of FIG. 6 and FIG. 7, the concept disclosed in FIG. 1, FIG. 2, FIG. 3, FIG. 4 and FIG. 5 is applied to a vacuum cleaner which is manually controlled rather than an auto cleaner. As illustrated in FIG. 6, the vacuum cleaner nozzle 600 comprises an optical sensor 601 and a light source 603. Please refer to FIG. 2 and FIG. 3 to understand the operations of the optical sensor 601 and the light source 603.

As illustrated in FIG. 2, when the light L is emitted to dirt 201, the light L is scattered thus scattering light SL is generated and the scattering light SL can be sensed by the optical sensor 103. Therefore, dirt on the surface Sr generates a bright region in an image of the surface Sr since the optical sensor 103 senses scattering light. It will be appreciated that the dirt can mean any unwanted things on the surface Sr, such as dusts, hairs, paper scraps, small stones, or plastic fragments. Also, the light L is reflected if the surface Sr has no dirt. Additionally, the operations of how to computing a dirt level are expressed in FIG. 3.

Comparing with the auto cleaner in above-mentioned embodiments, the dirt suction direction of the embodiment in FIG. 6 may be different. Please refer to FIG. 1, for an auto cleaner, the dirt suction direction is always but not limited to be perpendicular with the surface Sr, since the suction port is always provided below the auto cleaner. However, due to the mechanical structure of the vacuum cleaner nozzle 600 in FIG. 6, the dirt suction direction of the vacuum cleaner may not be perpendicular with the surface Sr.

FIG. 7 is a schematic diagram illustrating the dirt suction direction of the vacuum cleaner in FIG. 6, which is viewed in an X direction in FIG. 6. As illustrated in FIG. 7, dirt 701 is on a surface Sr which is to be cleaned, and the region 703 means a region which is emitted by the light from the light source LS in FIG. 6. Please note, the region 703 is only for explaining, and a location and a size thereof are not limited to the example in FIG. 7. In FIG. 7, the vacuum cleaner may have a dirt suction direction SD1 or a dirt suction direction SD2. The dirt suction direction SD1 is parallel with the surface Sr. Also, an angle $\theta$ between the surface Sr and the dirt suction direction SD2 is smaller than 90°. The angle $\theta$ is a smallest angle among the angles between the surface Sr and the dirt suction direction SD2.

After determining the dirt level, the vacuum cleaner can select a suitable suction power corresponding to the dirt level. A conventional vacuum cleaner does not have a dirt level determining mechanism, or does not use an optical method to determine the dirt level. For example, a conventional vacuum cleaner may detect a density of the dirt in the flow sucked into the vacuum cleaner. However, for such method, detection errors may occur when the dust box in the vacuum cleaner is almost full. Therefore, the embodiments illustrated in FIG. 6 and FIG. 7 can use a simple structure to determine a dirt level.

In view of above-mentioned embodiments, the dirt level can be determined according to optical data, thus the operation of the auto cleaner or any other optical device can be properly controlled corresponding to the dirt level.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical device, comprising:
a processing circuit;
a light source, configured to emit light to a surface; and
an optical sensor, configured to sense optical data generated based on reflected light or scattering light of the light;
wherein the processing circuit computes a dirt level of the surface according to the optical data;
wherein the optical data comprises images, wherein each image of the images comprises at least one bright region and at least one dark region, wherein the processing circuit computes the dirt level according to a proportion between an area of the bright region in the each image and an area of all regions of the each image or according to a number of the bright region in the each image;
wherein a number of the images is larger than 2, wherein the processing circuit computes the dirt level according to a proportion between an area of all of the bright regions in the images and an area of all regions of the images, or according to a number of all of the bright regions in the images.

2. The optical device of claim 1, further comprising a case comprising a case surface, wherein the optical sensor and the light source are provided inside or on the case, wherein an angle between an emitting direction of the light and the case surface is smaller than a predetermined angle, such that a brightness of the dark region is lower than a first predetermined brightness.

3. The optical device of claim 1, wherein the light is region light or line light.

4. The optical device of claim 1, wherein the optical device is an auto cleaner, an optical mouse or a vacuum cleaner.

5. The optical device of claim 1,
wherein the optical device locates on the surface;
wherein the optical device is a vacuum cleaner, a dirt suction direction of the optical device is parallel with the surface, or an angle between the surface and the dirt suction direction is smaller than 90°.

6. A dirt level determining method, applied to an optical device comprising a light source and an optical sensor, comprising:

(a) emitting light to a surface by the light source; and (b) sensing optical data generated based on reflected light or scattering light of the light by the optical sensor; and (c) computing a dirt level of the surface according to the optical data;

wherein the optical data comprises images, wherein each image of the images comprises at least one bright region and at least one dark region, wherein the step (c) computes the dirt level according to a proportion between an area of the bright region in the each image and an area of all regions of the each image or according to a number of the bright region in the each image;

wherein a number of the images is larger than 2, wherein the step (c) computes the dirt level according to a proportion between an area of all of the bright regions in the images and an area of all regions of the images, or according to a number of all of the bright regions in the images.

7. The dirt level determining method of claim 6, further comprising a case comprising a case surface, wherein the optical sensor and the light source are provided inside or on the case, wherein an angle between an emitting direction of the light and the case surface is smaller than a predetermined angle, such that a brightness of the dark region is lower than a first predetermined brightness.

8. The dirt level determining method of claim 6, wherein the light is region light or line light.

9. The dirt level determining method of claim 6, wherein the optical device is an auto cleaner, an optical mouse or a vacuum cleaner.

10. The dirt level determining method of claim 6 wherein the optical device locates on the surface;

wherein the optical device is a vacuum cleaner, a dirt suction direction of the optical device is parallel with the surface, or an angle between the surface and the dirt suction direction is smaller than 90°.

11. An optical device, comprising:

a processing circuit;

a light source, configured to emit light to a surface; and an optical sensor, configured to sense optical data generated based on reflected light or scattering light of the light;

wherein the processing circuit computes a dirt level of the surface according to the optical data;

wherein the optical data comprises images, wherein each image of the images comprises at least one bright region and at least one dark region, wherein the processing circuit computes the dirt level according to a proportion between the dark region in the each image and all region of the image or according to a number of the dark region in the each image;

wherein a number of the images is larger than 2, wherein the processing circuit computes the dirt level according to a proportion between all of the dark regions in the images and all region of the images, or according to a number of all the dark regions in the images.

12. A dirt level determining method, applied to an optical device comprising a light source and an optical sensor, comprising:

(a) emitting light to a surface by the light source; and (b) sensing optical data generated based on reflected light or scattering light of the light by the optical sensor; and (c) computing a dirt level of the surface according to the optical data;

wherein the optical data comprises images, wherein each image of the images comprises at least one bright region and at least one dark region, wherein the step (c) computes the dirt level according to a proportion between the dark region in the each image and all region of the image or according to a number of the dark region in the each image;

wherein a number of the images is larger than 2, wherein the step (c) computes the dirt level according to a proportion between all of the dark regions in the images and all region of the images, or according to a number of all the dark regions in the images.

* * * * *